United States Patent
Moulik et al.

(10) Patent No.: US 10,282,353 B2
(45) Date of Patent: May 7, 2019

(54) PROACTIVE DUPLICATE IDENTIFICATION

(71) Applicant: Accenture Global Services Limited, Dublin (IE)

(72) Inventors: Jaydeep Moulik, Mandaluyong (PH); Varun Bhatia, Eastwood (PH); Michael J. N. Lorenzo, Pasay (PH); Rover Jay D. De Vera, Valenzuela (PH)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 827 days.

(21) Appl. No.: 14/632,900

(22) Filed: Feb. 26, 2015

(65) Prior Publication Data

US 2016/0253350 A1    Sep. 1, 2016

(51) Int. Cl.
*G06F 16/23* (2019.01)
*G06F 16/22* (2019.01)

(52) U.S. Cl.
CPC .......... *G06F 16/2365* (2019.01); *G06F 16/22* (2019.01)

(58) Field of Classification Search
CPC .......... G06F 17/30011; G06F 21/6227; G06F 17/30067; G06F 17/30286
USPC ........................................................ 707/694
See application file for complete search history.

(56) References Cited

U.S. PATENT DOCUMENTS

| | | | |
|---|---|---|---|
| 8,832,034 B1 * | 9/2014 | Ramarao ........... | G06F 17/30156 707/664 |
| 9,104,328 B2 * | 8/2015 | Hayasaka ......... | G06F 17/30156 |
| 2002/0194174 A1 * | 12/2002 | Calkins ................... | G06Q 30/04 |
| 2008/0162478 A1 * | 7/2008 | Pugh ..................... | G06F 17/3071 |
| 2011/0004626 A1 * | 1/2011 | Naeymi-Rad .......... | G06N 7/005 707/776 |
| 2012/0150824 A1 | 6/2012 | Zhu | |
| 2014/0244300 A1 | 8/2014 | Bess et al. | |
| 2015/0142756 A1 * | 5/2015 | Watkins ............ | G06F 17/30194 707/692 |

OTHER PUBLICATIONS

Ahmed K. Elmagarmid, et al., "Duplicate Record Detection: A Survey", Jan. 2007, 16 pages.
David Doermann, et al., "The Detection of Duplicates in Document Image Databases", Jan. 1997, 41 pages.

* cited by examiner

*Primary Examiner* — Michael Pham
(74) *Attorney, Agent, or Firm* — Mannava & Kang, P.C.

(57) ABSTRACT

Proactive duplicate identification may include receiving a document, and determining data related to the document. The documents may be indexed from history data and/or current data for duplicate analysis of the document. The indexing of the documents may include an initial indexing based on the determination of the data related to the document for an initial data field, and a further indexing based on a further determination of further data related to the document for a further data field. The initial indexing may narrow a scope of the documents for the duplicate analysis, and the further indexing may further narrow the scope of the documents for the duplicate analysis. The indexed documents may be used to perform the duplicate analysis of the document to determine whether the document is a duplicate document, a probable duplicate document, or a non-duplicate document.

20 Claims, 12 Drawing Sheets

| Vendor #: | Invoice # | Invoice Date | Invoice Amount |
|---|---|---|---|
| Exact | Exact | Exact | Exact |
| Different | Exact | Exact | Exact |
| Exact | Similar | Exact | Exact |
| Exact | Exact | Similar | Exact |
| Exact | Exact | Exact | Similar |
| Exact | Similar | Exact | Similar |
| Exact | Similar | Similar | Exact |
| Exact | Exact | Similar | Similar |
| Different | Exact | Similar | Exact |

FIG. 2

| Form | | | | | | | |
|---|---|---|---|---|---|---|---|
| Create Form | | | Search | FORM NAME ⌄ | | Search | Refresh |
| # | | | | Form Name | | | |
| 1 | Edit | Delete | Preview | Sample Form 1 Edited | | | |
| 2 | Edit | Delete | Preview | Sample Form 2 Edited | | | |
| 3 | Edit | Delete | Preview | Form 3 | | | |
| 4 | Edit | Delete | Preview | Form 4 | | | |
| 5 | Edit | Delete | Preview | Form 5 | | | |

Create your own Data forms with Validations

FIG. 8A

| Create Form | | | | Add/Update Field |
|---|---|---|---|---|
| Form Name | | | | Field Name |
| Indexing Form | | | | Business Type |
| Form Fields | | | | Field Type |
| # | | | Field Name | DropDownList ⌄ |
| | | | | Field Choice |
| | | | | Enter the strings in the collection (one per line) |
| 1 | Edit | Delete | Invoice Number | Entrepreneur |
| 2 | Edit | Delete | Invoice Data | Partnership |
| 3 | Edit | Delete | Invoice Name | Corporation |
| 4 | Edit | Delete | Invoice Amount | Reserved Field Code |
| | | | | Reserved Field 01 ⌄ |
| Add Field | | | | |
| Save | | | | Add This Field   Close |

How you configure it?

FIG. 8B

Indexing Form

Invoice Number
1-052214-029735

Invoice Date
05/22/2014

Vendor Name
ABC Vendor Name Inc

Invoice Amount
$ 1911.75

Business Type
Entrepreneur

[Save] [Reject As Double]

How does the new form look

FIG. 8C

Create Dynamic Criterias

| RULE ID | RULE NAME | INVOICE NUMBER | INVOICE DATE | VENDOR | AMOUNT | STATUS |
|---|---|---|---|---|---|---|
|  | New Rule | EXACT | EXACT | EXACT | EXACT | ☐ Activated |
|  |  | EXACT / SIMILAR / DIFFERENT |  |  |  |  |

[Add] [Save] [Edit]

| Rule ID | Rule Name | Rule | Status | Created By | Created Date | UpdatedBy | Updated Date |
|---|---|---|---|---|---|---|---|
| 24 | Rule 14 | 2.1.3.3 | ☒ | 1 | 5/22/2014 4:21:56AM | 1 | 5/22/2014 4:21:56AM |
| 20 | yahoo | 3.1.1.1 | ☒ | 1 | 5/21/2014 4:55:55AM | 1 | 5/21/2014 4:55:55AM |
| 21 | Mynewrule | 2.1.3.1 | ☒ | 1 | 5/21/2014 5:02:33AM | 1 | 5/21/2014 5:02:33AM |
| 22 | RuleFive | 3.2.2.2 | ☒ | 1 | 5/21/2014 5:03:20AM | 1 | 5/21/2014 5:03:20AM |
| 23 | RuleKo | 3.1.1.1 | ☒ | 1 | 5/21/2014 5:04:18AM | 1 | 5/21/2014 5:04:18AM |
| 12 |  | 2.3.3.2 | ☒ | 1 | 5/21/201411:32:07AM | 1 | 5/21/201411:32:07AM |
| 13 |  | 2.3.3.2 | ☒ | 1 | 5/21/201411:35:47AM | 1 | 5/21/201411:35:47AM |

How do I configure my rules?

FIG. 8D

PROACTIVE DUPLICATE IDENTIFICATION

BACKGROUND

Extract, transform, and load (ETL) refers to operations for populating a database which may be used in a data warehouse. The data warehouse may provide data reporting and other data analysis functionality using the database.

In many instances, the data warehouse may be used to store relatively large amounts of data that may be provided by many different sources, and the data may be provided from the sources in an unstructured format or a format that is different from what can be understood by the database. The data from the data sources may be loaded into the database for various operations, such as, queries, reporting, and other data analysis functions.

ETL operations can facilitate the loading of the data from many different data sources into the database by transforming the data prior to the loading. The transforming may include formatting the data from the data sources to a format that is usable by the database.

BRIEF DESCRIPTION OF DRAWINGS

Features of the present disclosure are illustrated by way of examples shown in the following figures. In the following figures, like numerals indicate like elements, in which:

FIG. 2 illustrates core duplicate analysis rules for the proactive duplicate identification system of FIG. 1, according to an example of the present disclosure;

FIGS. 8A-8D illustrate various user interface displays for the proactive duplicate identification system of FIG. 1, according to an example of the present disclosure;

DETAILED DESCRIPTION

Figure 1:
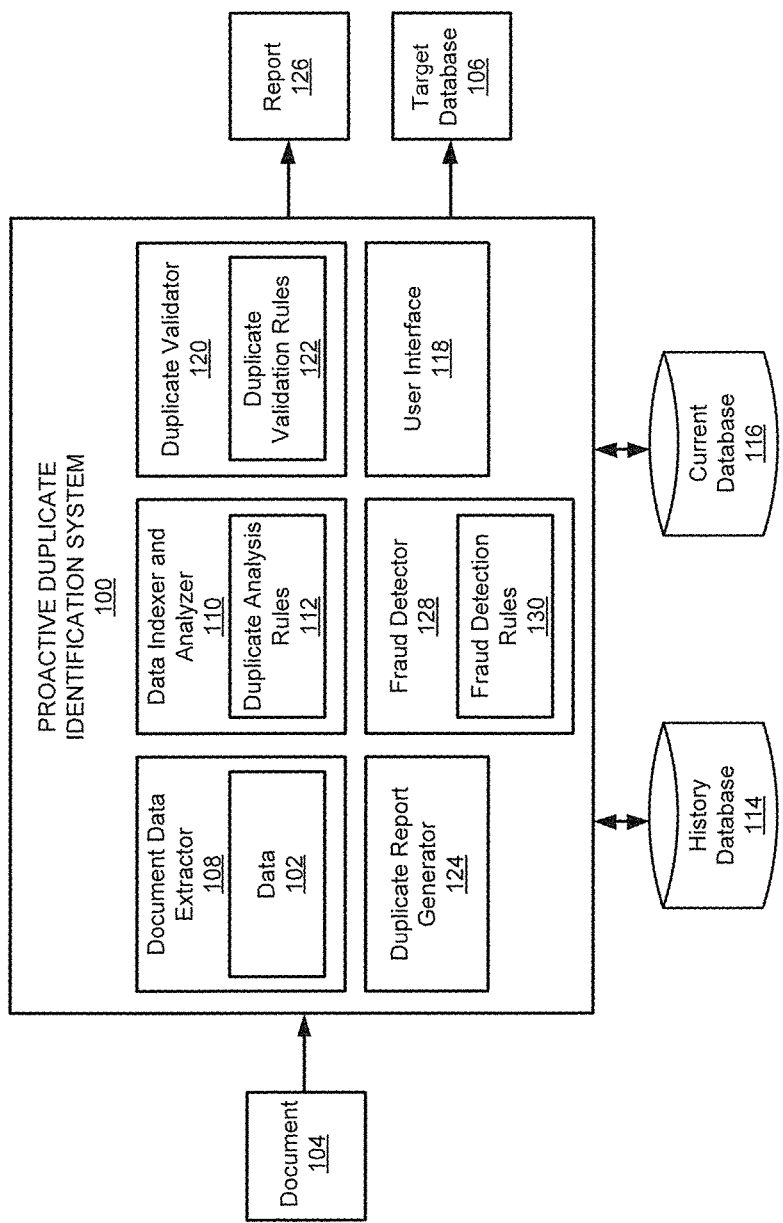
FIG. 1 illustrates a detailed architecture of a proactive duplicate identification system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to ETL operations, such operations can facilitate loading of data from many different data sources into a database by transforming the data prior to the loading. The transforming may include formatting the data from the data sources to a format that is usable by the database. The formatting may include elimination of duplicate information to improve efficiency of various operations, such as, queries, reporting, and other data analysis functions.

In this regard, duplicate information detection may be employed in a variety of industries, such as, educational, corporate, medical, etc. For example, duplicate information detection may be utilized to detect and eliminate duplicate documents to avoid unnecessary storage and analysis based expenditures related to resource utilization. That is, by eliminating duplicate information, storage related costs for such information are reduced. Further, the efficiency of operations, such as search and query operations related to such information, may be increased based on the elimination of duplicate information. In other areas, such as enterprise resource planning (ERP), duplicate information detection may be utilized to detect duplicate invoices to avoid duplicate payments and/or fraudulent activities related to the invoices. For example, in an invoice payment system, errors related to duplicate and/or fraudulent invoice payments may be eliminated by detection and removal of duplicate and/or fraudulent invoices from the invoice payment system prior to initiation of payment activities.

In order to address the aforementioned aspects, according to examples, a proactive duplicate identification system and a method for proactive duplicate identification are disclosed herein. The system and method disclosed herein may generally include a hardware implemented document data extractor that is executed by at least one hardware processor to receive a document, and determine (e.g., by entry, extraction, or other techniques) data related to the document. The document may include any type of document, such as a medical statement, an invoice, a bill of process, etc. According to an example, the document data extractor may receive a plurality of documents, and determine data related to the plurality of documents. Thus, with respect to operation of the system and method disclosed herein, any reference to a document that is received may similarly apply to a plurality of documents. The determination of the data related to the document may be performed as part of an extraction operation of an ETL process. The document data extractor may operate in conjunction with a user interface to generate a preview of the document. For example, the preview of the document may include a scanned image view, a tagged image file (TIF) based view, a portable document format (PDF) based view, etc.

A hardware implemented data indexer and analyzer that is executed by at least one hardware processor may dynamically (i.e., in real-time) index documents from history data stored in a history database, and/or current data stored in a current database for duplicate analysis of the received document. The duplicate detection may be performed as part of a transformation operation of an ETL process. The data indexer and analyzer may analyze the indexed data related to the document to determine, in real-time, whether the document is a duplicate document (i.e., a copy of the document exists in the history and/or current databases), a probable duplicate document (i.e., a copy of the document may exist in the history and/or current databases), or a non-duplicate document (i.e., no other copy of the document exists in the history and/or current databases).

The analysis of the document by the data indexer and analyzer may include a comparison of the data related to the document to the history data which is related to all documents of the history database, and/or to data related to documents that are accessible by the data indexer and analyzer within a specified time-frame (e.g., documents stored in the current database for a twenty-four hour period prior to receipt of the document by the document data extractor). The history database may also include a specified time-frame (e.g., one year) for all documents that are accessible by the data indexer and analyzer. Other aspects, such as metadata related to the form of the data (e.g., EXCEL, etc.), fields of the data (e.g., date field, title field, etc.), and duplicate analysis rules as disclosed herein, may also be stored in the history database. As disclosed herein, the analysis of the document by the data indexer and analyzer may be based on the duplicate analysis rules, that include, for example, core duplicate analysis rules, fuzzy matching rules, etc.

For any documents that are identified as probable duplicates, a hardware implemented duplicate validator that is executed by at least one hardware processor may validate the probable duplicate determination by the data indexer and analyzer. For example, the duplicate validator may apply a set of duplicate validation rules to validate the probable duplicate determination by the data indexer and analyzer. Further, upon the detection of a duplicate and/or probable document, a user may be presented with an option to continue with further duplicate detection of any remaining documents, and/or for visual analysis of the identified document for duplicate and/or probable duplicate confirmation prior to further duplicate detection.

A hardware implemented duplicate report generator that is executed by at least one hardware processor may generate various reports based on the duplicate analysis by the data indexer and analyzer and/or the duplicate validator. For example, the reports may include information with respect to trends related to the document, probabilities of duplicate determination related to the document, etc.

A hardware implemented fraud detector that is executed by at least one hardware processor may operate in conjunction with the data indexer and analyzer and/or the duplicate validator to identify documents that may include fraudulent data. The fraud detector may identify documents that may include fraudulent data based on a set of fraud detection rules.

Documents that are not duplicates and/or identified as not including fraudulent data may be entered, for example, in an ERP system for further processing. The entry into the ERP system (or a database generally) may be performed as part of a load operation of an ETL process. For the example of invoices, the documents that are entered in the ERP system may be processed for payment.

The system and method disclosed herein may provide for the setting up of a user account by providing specific access for specified components of the system disclosed herein. The various forms and fields related to duplicate identification may be dynamically created and previewed at a user interface of the system disclosed herein. Rules related to duplicate identification for the system and method disclosed herein may also be dynamically created by a user of the system disclosed herein.

The system disclosed herein may be implemented as a webpage based system. The system disclosed herein may be structured to include a multi-tier architecture. According to an example, the multi-tier architecture may include a presentation layer, a logic layer, and a data layer. The presentation layer may represent the upper level of the system disclosed herein, and include the user interface of the system disclosed herein. The logic layer may include the classes for all of the components of the system disclosed herein. The components may include, for example, the document data extractor, the data indexer and analyzer, the duplicate validator, the duplicate report generator, the fraud detector, etc. The data layer may include the data that is stored and retrieved from the history and the current databases. According to an example, the machine readable instructions of the system disclosed herein may be based on object oriented programming (OOP).

The proactive duplicate identification system and the method for proactive duplicate identification disclosed herein provide a technical solution to technical problems related, for example, to real-time analysis of duplicate documents. The system and method disclosed herein provide the technical solution of a hardware implemented data indexer and analyzer to dynamically index documents of a history database and/or a current database. Based on the dynamic indexing of the documents of the history database and/or the current database, matching of data from an input document to the documents of the history database and/or the current database is expedited for determination of whether the input document is a duplicate document, a probable duplicate document, or a non-duplicate document. The system and method disclosed herein further provide the technical solution of eliminating duplicate documents before such documents may be entered in a database for storage or further processing. For example, with respect to invoices, the system and method disclosed herein provide the technical solution of eliminating duplicate invoices before such invoices may be entered in an ERP system for further processing related to payments. Thus, by eliminating duplicate documents before such documents may be entered in a database for storage or further processing, the system and method disclosed herein provide the technical solution of reducing inefficient storage utilization of the database, and thus reducing inefficient processing related to information stored in the database. For example, the inefficient processing related to information stored in the database may be related to non-uniform memory access (NUMA), where the memory access time depends on the memory location of stored data relative to the processor. The inefficient processing related to information stored in the database may also be related to processing of duplicate information, which results in inefficient use of processing time, central processing unit (CPU) cycles, etc. With respect to ETL operations, the system and method disclosed herein provide the technical solution of transforming the data of an input document to remove duplicate documents, such that input documents that are not duplicates may be stored for further analysis (e.g., querying, payment, etc.).

FIG. 1 illustrates a detailed architecture of a proactive duplicate identification system 100, which may be part of an ETL process, according to an example of the present disclosure. The system 100 may facilitate data construction operations for the ETL process to transform data 102 from a document 104 for loading of the data 102 and/or the document 104 into a target database 106. According to an example, the target database may be an ERP system.

The system 100 may include a hardware implemented document data extractor 108 to process the document 104 to determine the data 102 related to the document 104. The determination of the data 102 may be performed as part of an extraction operation of the ETL process. The document data extractor 108 may process the document 104 to dynamically (i.e., in real-time) configure a form related to the document 104 for upload of the data 102. With respect to dynamic configuration of the form related to the document 104, the document data extractor 108 may provide for the configuration of various fields of the form related to the document 104, the type of the data 102 of the document 104, and any validations related to the document 104. For an example of an invoice, referring to FIG. 2, the fields of the form related to the document 104 may include a vendor number field, an invoice number field, an invoice date field, an invoice amount field, and other such fields. With respect to other industries, such as the medical industry, the fields of the form related to the document 104 may include a medical provider name and/or number, a patient name and/or number, an insurance company name and/or number, a procedure date, a procedure amount, etc. According to another example, for the insurance industry, the fields of the form related to the document 104 may include an insurance company name and/or number, an insured entity name and/or number, a claim date, a claim amount, etc. According to another example, with respect to record management systems and/or a database where the duplicate analysis may be used to validate data and/or eliminate duplicate data, the fields of the form related to the document 104 may include a record name and/or number, related entity name and/or number, a record date, etc. Thus, the fields of the form related to the document 104 may include any type of information related to a particular industry or area where duplicate analysis may be relevant. Further, the type of the data 102 may include information related to whether the data is numerical, text, etc. The validations related to the document 104 may include information related to previous and/or current status information related to the document, such as, whether the document is a duplicate document, a probable duplicate document, or a non-duplicate document.

A hardware implemented data indexer and analyzer 110 may analyze the document 104 based on a set of duplicate analysis rules 112, that include, for example, core duplicate analysis rules, fuzzy matching rules, etc. The analysis of the document 104 by the data indexer and analyzer 110 for duplicate detection may be performed as part of a transformation operation of the ETL process.

The core duplicate analysis rules may include duplicate analysis related to various fields corresponding to the document 104. For the example of the invoice, the fields related to the document 104 may include a vendor number field, an invoice number field, an invoice date field, an invoice amount field, and other such fields. For the example of the invoice, referring to FIG. 2, the core duplicate analysis rules may be used to analyze documents of a history database 114 and/or documents of a current database 116 with respect to the vendor number field, the invoice number field, the invoice date field, and/or the invoice amount field (based, for example, on an order of data determination from the document 104). If the vendor number, invoice number, invoice date, and invoice amount of the document 104 (from the corresponding vendor number field, invoice number field, invoice date field, and invoice amount field) exactly match (i.e., per row-1 of the core duplicate analysis rules) the respective values for a document from the history database 114 and/or the current database 116, then the document 104 may be designated as a duplicate (or a duplicate document). With respect to the remaining rows of the core duplicate analysis rules (i.e., row-2 to row-9 for the example of FIG. 2), based on a corresponding match of the vendor number, invoice number, invoice date, and/or invoice amount of the document 104 (from the corresponding vendor number field, invoice number field, invoice date field, and invoice amount field) to the respective values for a document from the history database 114 and/or the current database 116, the document 104 may be designated as a probable duplicate.

The fuzzy matching rules, which may be part of the core duplicate analysis rules, may include a predetermined percentage difference rule, a division based rule, a pattern based rule, a similarity based rule, and other user-defined rules. The fuzzy matching rules may be used to determine the "similar" aspect of the core duplicate analysis rules, which may include a determination of "exact", "similar", or "different" as described herein with reference to FIG. 2.

For the example of the invoice, for the fuzzy matching rules, the predetermined percentage difference rule (e.g., invoice amounts may be +/−3% of one another ($250.00 and $248.00)) may be used to identify potential duplicate invoices. The division based rule may be based on whether invoice amounts are divisible by a predetermine number (e.g., invoice amounts may be ½ of one another ($250.00 and $500.00)). The invoice amount pattern based rule may be based on whether the invoice amount pattern includes a certain digit pattern (e.g., invoice amounts may start with the same first four digits ($123.45 and $1,234.50)). The invoice date pattern based rule may be based on whether the invoice date pattern is a certain number of days apart (e.g., invoice dates may be eight (or another user configurable) number of days apart). The invoice number similarity based rule may be based on whether the invoice number is similar to other invoice numbers (e.g., invoice numbers are similar when they contain the same numbers). The invoice number pattern based rule may be based on whether the invoice number pattern is similar to other invoice numbers (e.g., invoice numbers without leading and trailing zeros, and letters are similar (001234RE and 123400)).

With respect to the fuzzy matching rules, for the example of the invoice, based on a match of the vendor number, invoice number, invoice date, and/or invoice amount of the document 104 (from the corresponding vendor number field, invoice number field, invoice date field, and invoice amount field) to the respective values for a document from the history database 114 and/or the current database 116, the document 104 may be designated as a probable duplicate.

With respect to the core duplicate analysis rules and the fuzzy matching rules, if there are no matches of the data for the corresponding fields to a document from the history database 114 and/or the current database 116, then the document 104 may be designated as a non-duplicate document. For the example of the invoice, if none of the data for the invoice matches data for an invoice from the history database 114 and/or the current database 116, then the invoice may be designated as a non-duplicate invoice.

Once the data 102 is uploaded to the system 100, the data indexer and analyzer 110 may index documents from the history database 114 and/or the current database 116. In this regard, dynamic form creation that is used to determine the data 102 may include creation of the form (for obtaining the data 102) for mapping to the history database 114 and/or the current database 116. Thus, according to an example, a user may dynamically enter the data 102 into a form provided by the document data extractor 108 based on the user's need. For example, a user may enter data for fields of the form that are relevant to the user (e.g., for a form including ten fields, a first user may enter data into three of the ten fields, while a second user may enter data into five of the ten fields, etc.). The document data extractor 108 may also generate different types of forms including different types of fields for different applications (e.g., academic, medical, ERP, etc.). For the example of the invoice that includes four fields (e.g., vendor number field, invoice number field, invoice date field, and invoice amount field, or any other user-generated field), when data (e.g., a vendor number) is determined (e.g., by entry, extraction, or other techniques) from the document 104 in a form for the document data extractor 108, the data indexer and analyzer 110 may generate an index including the documents (e.g., invoices) for the particular field (e.g., the vendor number field) for further searching. That is, the fields may operate as the index for further searching.

Once data for a specified field is determined from the document 104, the index for the documents for that specified field may be generated from the history database 114 and/or the current database 116. For the example of the invoice that includes four fields, once data for the vendor number field is determined from the document 104, the index for the documents for the vendor number field may be generated from the history database 114 and/or the current database 116. The index may include unique buckets that correspond to unique values for the specified field. For the example of the invoice that includes four fields, the index may include unique buckets that correspond to unique values for the vendor number field. Further, duplicate analysis may commence on a corresponding matching bucket of the index to determine whether the document 104 is a duplicate document, a probable duplicate document, or a non-duplicate document. For the example of the invoice that includes four fields, duplicate analysis may commence on a corresponding matching bucket of the index (i.e., the bucket that includes the matching vendor number) to determine whether the document 104 is a duplicate document, a probable duplicate document, or a non-duplicate document. The duplicate analysis may be based, for example, on the core duplicate analysis rules, the fuzzy matching rules, and/or any user defined rules.

When data for a further field is determined from the document 104, the further index for the documents for that further field may be generated from the history database 114 and/or the current database 116. For the example of the invoice that includes four fields, once data for the invoice number field is determined from the document 104, the further index for the documents for the invoice number field may be generated from the history database 114 and/or the current database 116. The further index may include unique buckets that correspond to unique values for the further field. For the example of the invoice that includes four fields, the further index may include unique buckets that correspond to unique values for the invoice number field. According to an example, this further index may be placed in the corresponding matching bucket of the index based on the initial specified field to determine whether the document 104 is a duplicate document, a probable duplicate document, or a non-duplicate document. For the example of the invoice that includes four fields, this further index may be placed in the corresponding matching bucket of the index based on the vendor number field to determine whether the document 104 is a duplicate document, a probable duplicate document, or a non-duplicate document. Further, duplicate analysis may commence on a corresponding matching bucket of the further index to determine whether the document 104 is a duplicate document, a probable duplicate document, or a non-duplicate document. For the example of the invoice that includes four fields, duplicate analysis may commence on a corresponding matching bucket of the further index (i.e., the bucket that includes the matching invoice number) to determine whether the document 104 is a duplicate document, a probable duplicate document, or a non-duplicate document.

In this manner, the scope of the duplicate analysis of data from the history database 114 and/or the current database 116 may be reduced as each index that is generated as data for a field is determined reduces the corresponding number of documents that are to be analyzed. That is, the first index based on a first data entry for a field may reduce the corresponding number of documents that are to be analyzed with respect to the field of the first data entry, the second index based on a second data entry for a field may reduce the corresponding number of documents that are to be analyzed with respect to the fields of the first and second data entries, and so forth.

The data indexer and analyzer 110 may also generate buckets with respect to each of the tests performed for the core duplicate analysis rules and the fuzzy matching rules. For example, documents from the history database 114 and/or the current database 116 that match data for the document 104 based on the analysis with respect to the core duplicate analysis rules (e.g., nine buckets for the nine rows for the example of FIG. 2) and the fuzzy matching rules (e.g., a bucket for each fuzzy matching rule) may be placed in buckets for identification as duplicate, probable duplicate, or non-duplicate.

Figure 3:
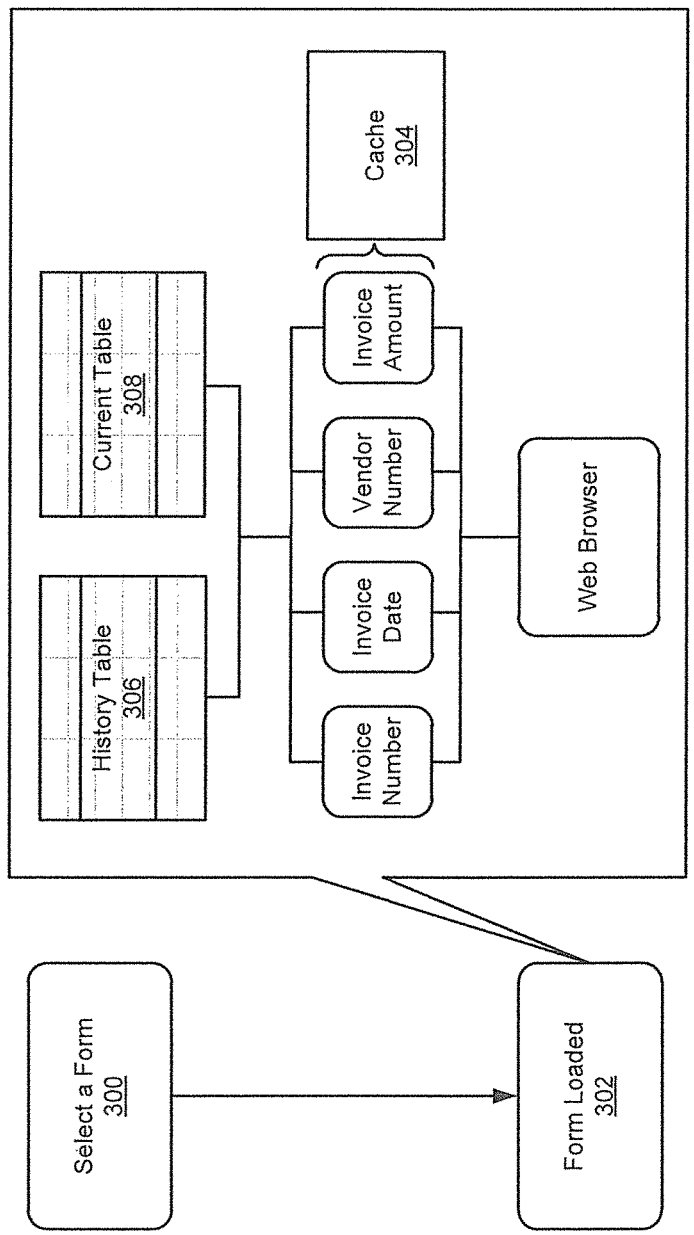
FIG. 3 illustrates cache generation for the proactive duplicate identification system of FIG. 1, according to an example of the present disclosure.

With respect to operation of the data indexer and analyzer 110, FIG. 3 illustrates cache generation for the system 100, according to an example of the present disclosure. Referring to FIGS. 1 and 3, the data indexer and analyzer 110 may utilize a user interface 118 to display a list of indexing forms generated by the document data extractor 108. The indexing forms may be described as fillable (and/or pluggable) forms that may be completed by a user of the system 100 to determine (e.g., by entry, or otherwise) the data 102 related to the document 104. The indexing forms may be tailored to a particular application (e.g., academic, medical, ERP, etc.). Based on the selection of one of the indexing forms at 300, at 302, the selected indexing form may be loaded and used to generate a cache 304 of data retrieved from a history table 306 of the history database 114 and a current table 308 of the current database 116. The retrieval of data may be based on tagged rules from the selected indexing form. For example, referring to FIG. 2, a tagged rule may represent one of the rules listed in rows 1-9 (e.g., row-2 that includes different, exact, exact, and exact, respectively for vendor number, invoice number, invoice date, and invoice amount). The cache 304 may be used as a data source of an autocomplete feature of the selected indexing form. For example, an indexing form may include a table including columns for cases, invoice number, vendor number, date, amount, and status, which may include respective entries for row-1 as case-1, 0001, company-A, 01/1/2015, 200,000.00, historical data, row-2 as case-2, 0001, company-A, 02/02/2015, 25.00, new entry, etc. In this example, with respect to the autocomplete feature, upon typing "0" in the invoice field, a "0001" for case-1 may be displayed as a proactive prompt indicating probable duplicate data. The autocomplete feature may be implemented, for example, by using JQUERY AJAX. For the example of the invoice, the cache 304 may be available for four key fields that include the invoice number field, the invoice date field, the vendor number field, and the invoice amount field. Thus, for the example of the invoice, the fields tagged as these four key fields may include the autocomplete feature.

Upon typing in the fields that are tagged as the key fields (e.g., the four key fields for the example of the invoice), the data indexer and analyzer 110 may activate the autocomplete feature and check for the presence of the same data in the cache 304. The autocomplete feature may disregard the casing of any letters in the key fields. If a data entry on a list of the autocomplete is selected, the selected data entry may apply on a textbox of the corresponding autocomplete. For example, with respect to an invoice, an indexing form may include a table including columns for cases, invoice number, vendor number, date, amount, and status, which may include respective entries for row-1 as case-1, 0001, company-A, 01/1/2015, 200,000.00, historical data, row-2 as case-2, 0001, company-A, 02/02/2015, 25.00, new entry, etc. In this example, with respect to the autocomplete feature, upon typing "0" in the invoice field, a "0001" for case-1 may be displayed as a proactive prompt indicating probable duplicate data. Further, upon selection of the "0001" prompt from the autocomplete list, the selection may apply only in the invoice number field. An autocomplete functionality may also apply for the rest of the key fields (e.g., cases, vendor number, date, amount, and status) based on the tagged rule. The data indexer and analyzer 110 may also provide an option to attach a scanned image or PDF that corresponds to the data.

After the data 102 is determined from the document 104, a user of the system 100 may be provided with options to "save" the document 104 or "reject as duplicate".

Figure 4:
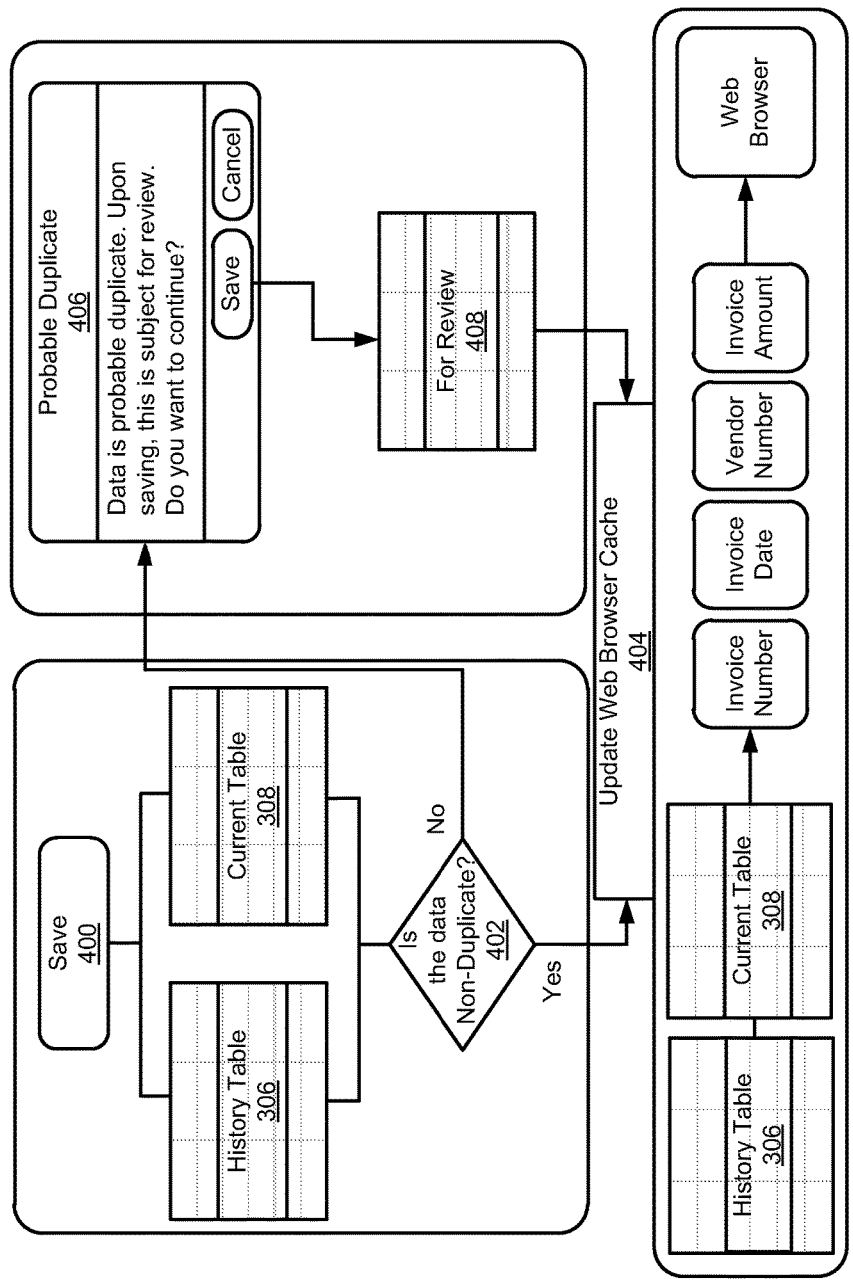
FIG. 4 illustrates a "save" process for the proactive duplicate identification system of FIG. 1, according to an example of the present disclosure.

FIG. 4 illustrates a "save" process for the proactive duplicate identification system 100, according to an example of the present disclosure. With respect to selection of the "save" option at 400, at 402 the data indexer and analyzer 110 may determine if there are possible duplicates in the history table 306 and the current table 308. In this regard, in response to a determination that there are no duplicates detected (based on the rules (e.g., the core duplicate analysis rules, and fuzzy matching rules) tagged in the form), at 404, the data indexer and analyzer 110 may save the data on the current table 308, and further update its cache by retrieving data on the current table 308.

Alternatively, in response to a determination that there are duplicates detected, at 406, the data indexer and analyzer 110 may generate a prompt that indicates that the data is a probable duplicate, and request confirmation to continue on saving. In this regard, the data indexer and analyzer 110 may generate the options to "save" or "cancel". If the "save" option is selected with respect to the probable duplicate, the data may be placed in a "for review" table 408 in the current database 116 for further analysis by a duplicate validator 120 (see FIG. 1). The first rule (e.g., one of the core duplicate analysis rules, and fuzzy matching rules)) where the data was detected as a duplicate, and all possible duplicate data may also be saved in the current database 116. After saving the data, at 404, the cache 304 may also be updated by retrieving data from the current table 308. If the "cancel" option is selected with respect to the probable duplicate, the prompt that indicates that the data is a probable duplicate may be removed, and processing may revert to the indexing form again without any further action being taken by the data indexer and analyzer 110.

Figure 5:
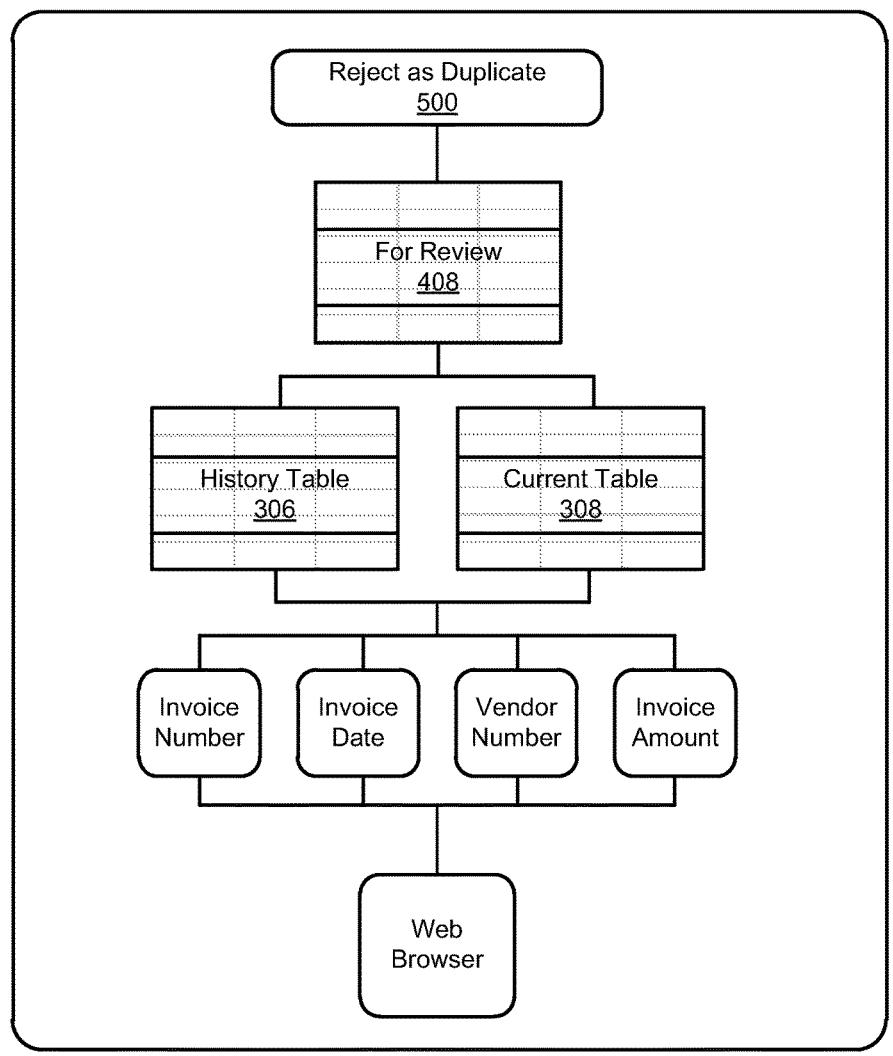
FIG. 5 illustrates a "reject as duplicate" process for the proactive duplicate identification system of FIG. 1, according to an example of the present disclosure.

FIG. 5 illustrates a "reject as duplicate" process for the proactive duplicate identification system 100, according to an example of the present disclosure. With respect to selection of the "reject as duplicate" option at 500, the data 102 may be placed in the "for review" table 408 in the current database 116 for further analysis by the duplicate validator 120. The first rule where the data was detected as a duplicate, and all possible duplicate data may also be saved in the "for review" table 408 in the current database 116. After saving the data in the "for review" table 408 in the current database 116, the cache 304 may also be updated by retrieving data from the current table 308.

The data indexer and analyzer 110 may also include options to display the data encoded on the forms on the current session. These options may include, for example, "reject", and "non-duplicate". With respect to the "reject" option, the data indexer and analyzer 110 may display data upon selection of the "reject as duplicate" option at 500. With respect to the "non-duplicate" option, the data indexer and analyzer 110 may display data upon selection of the "save" option at 400.

For any documents that are identified as probable duplicates, the duplicate validator 120 may validate the duplicate determination by the data indexer and analyzer 110. For example, referring to FIG. 1, the duplicate validator may apply a set of duplicate validation rules 122. The duplicate validation rules 122 may be dynamically generated by the duplicate validator 120 to validate the duplicate determination by the data indexer and analyzer 110. Similar to the example of FIG. 2, for the example of the invoice, the duplicate validation rules 122 may include "exact", "similar", and "different" options that are set in the key fields vendor number, invoice number, invoice date, and invoice amount. For example, a duplicate validation rule (e.g., rule-1) may include rules specified as exact, exact, exact, and different, and for rule-2, the rules may be specified as exact, exact, exact, and similar (e.g., in terms of 30%, 60%, or 90% of the value). For the example of the invoice, the duplicate validator 120 may implement the duplicate validation rules 122 for further considerations with respect to certain vendors (e.g., takeout vendors). The duplicate validator 120 may also implement the duplicate validation rules 122 for further considerations with respect to certain types of invoice amounts (e.g., rent/lease payments), where duplicate amounts may be common, and omit invoice numbers. In this regard, the duplicate validation rules 122 may be used to confirm validity of the duplicate determination by the data indexer and analyzer 110. The duplicate validator 120 may also query a user to confirm the validity of the duplicate determination by the data indexer and analyzer 110 (i.e., where data is tagged by the duplicate validation rules 122 as duplicate, probable duplicate, or as non-duplicate).

With respect to operation of the duplicate validator 120, the data that is needed by the duplicate validator 120 may not be displayed. The duplicate validator 120 may receive a selection of a filter and search option (e.g., by a user of the system 100) to add filters that will be applied in the search, for example, for clarification. The filters that are available may include a "reserved field code" filter. The reserved field code may include sets of fields that are used to define the fields of an indexing form. For the example of the invoice, in addition to the four key fields (vendor number, invoice number, invoice date, and invoice amount), a plurality (e.g., 50) of reserved field codes may be used for each indexing form. A reserved field code may use and include a pattern similar to the fields in an ERP system, or to the fields of the document 104.

If data is already provided by the duplicate validator 120, a selection may be made as to what is to be reviewed for the data. The data may include data that is encoded by the data indexer and analyzer 110, and the data, upon saving may be detected by the data indexer and analyzer 110 as probable duplicate data. Further, this data may also include data that is tagged by the data indexer and analyzer 110 as being probable duplicate data. For example, a user of the system 100 may check a checkbox of the corresponding data, and select an "add to my review list" option. Selected data may be placed in a queue for the user, for example, in a review list.

In the "review list", a user of the system 100 may view the details of the data that is to be reviewed. The details may include, for example, the rule where the data was detected as a duplicate, the duplicate data, scanned image of the document 104, etc. Upon reviewing the data, the user of the system 100 may be provided with the options to identify the data as non-duplicate, as duplicate, or to discontinue further processing, for example, by prompts that respectively include "non-duplicate", "duplicate", and "close" options. Based on the selection of the "close" option, details of the selected data may be hidden from the display of the user interface 118 (see FIG. 1).

Figure 6:
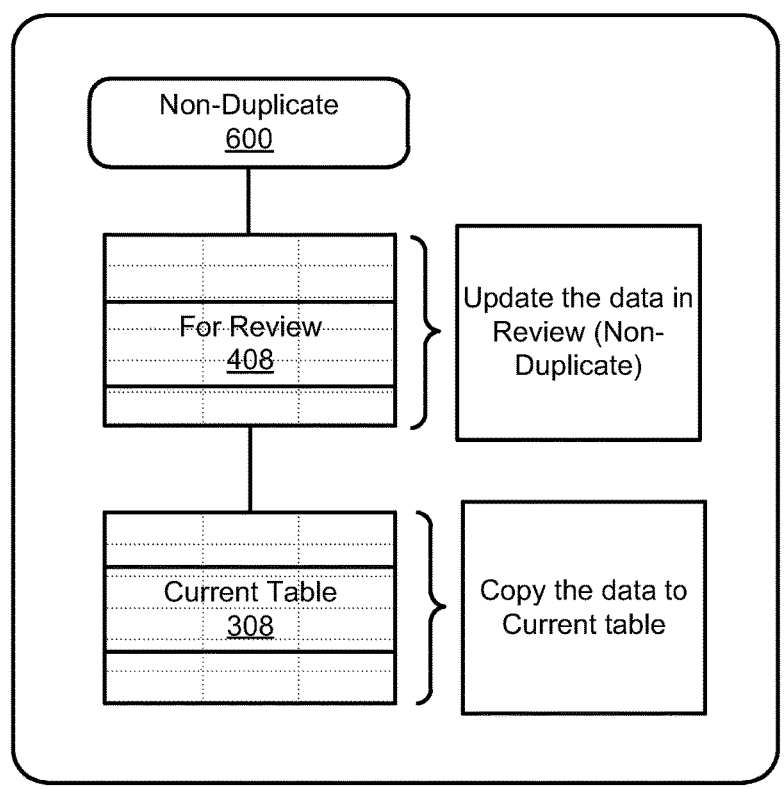
FIG. 6 illustrates a "non-duplicate" process for the proactive duplicate identification system of FIG. 1, according to an example of the present disclosure.

With respect to the prompts that respectively include "non-duplicate", "duplicate", and "close" options, FIG. 6 illustrates a "non-duplicate" process for the proactive duplicate identification system 100, according to an example of the present disclosure. With respect to the "non-duplicate" process, based on the selection of a "non-duplicate" option at 600, the data in the "for review" table 408 may be tagged as non-duplicate, and the details of the data may be placed on the "current" table 308. The data indexer and analyzer 110 may thus use the data in the "current" table 308 for identifying duplicates.

Figure 7:
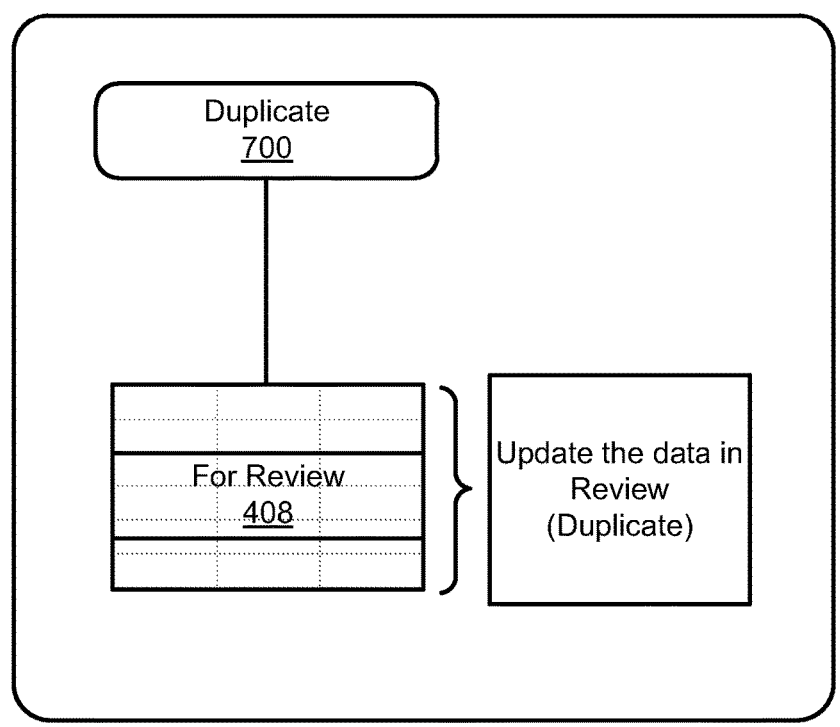
FIG. 7 illustrates a "duplicate" process for the proactive duplicate identification system of FIG. 1, according to an example of the present disclosure.

With respect to the prompts that respectively include "non-duplicate", "duplicate", and "close" options, FIG. 7 illustrates a "duplicate" process for the proactive duplicate identification system 100, according to an example of the present disclosure. With respect to the "duplicate" process, based on the selection of a "duplicate" option at 700, the data in the "for review" table 408 may be tagged as duplicate.

Referring to FIG. 1, a duplicate report generator 124 may generate a report 126 based on the duplicate analysis by the data indexer and analyzer 110 and/or the duplicate validator 120. For example, the report 126 may include information with respect to trends related to the document 104, probabilities of duplicate determination related to the document 104, etc. The report 126 may be based, for example, on analysis by duplicate analysis rules 112, analysis by vendor having duplicates, analysis by type of match (e.g., exact, similar, or no match), analysis on vendor name (e.g., in the case of invoices) on duplicate count and amount, and/or analysis by agent name on duplicates that are not identified during indexing by the data indexer and analyzer 110, but identified as duplicates by the duplicate validator 120. The analysis may be based on Pareto analysis based on the Pareto principle that states that, for many events, approximately 80% of the effects come from 20% of the causes. For the example of the invoice, the Pareto analysis may be used to identify vendors who are responsible for most (e.g., 80%) of the duplicate invoices. Other types of the report 126 may be based, for example, on duplicate dashboard by period (e.g., week, month, year, etc.), duplicate dashboard by region, a third party with a high number of duplicates, and/or similar vendor identification (ID) and name causing maximum duplicates. Other types of the report 126 may be based, for example, on duplicates identified during indexing by the data indexer and analyzer 110, and/or duplicates identified in review by the duplicate validator 120. Other types of the report 126 may be based, for example, on documents identified as duplicates during indexing by the data indexer and analyzer 110 but determined as non-duplicate at review by the duplicate validator 120, and/or documents identified as non-duplicate during indexing by the data indexer and analyzer 110 but determined as duplicate at review by the duplicate validator 120. Other types of the report 126 may include, for example, average hold time (AHT) for indexing and duplicate identification, separated by year-to-date, month-to-date, etc., a timeframe (e.g., weeks, months, etc.) with highest duplicates, and/or graphs with respect to duplicate and non-duplicate documents.

Referring to FIG. 1, a fraud detector 128 may operate in conjunction with the data indexer and analyzer 110 and/or the duplicate validator 120 to determine whether the document 104 includes fraudulent data. The fraud detector 128 may utilize fraud detection rules 130 to determine, for example, documents that include certain types of numerical values. For example, for the example of the invoice, the fraud detection rules 130 may be used to identify rounded-amount invoices, invoices that include digit frequencies that violate that normal (i.e., expected) behavior, invoices that include an invoice amount that is close to but less than a threshold amount for approval, invoices that result from an out of the ordinary volume of activities, invoices that include an above average invoice amount, and/or invoices that include a mail drop as an address. With respect to invoices that include digit frequencies that violate that normal behavior, such invoices may be determined by using Benford's Law to identify a normal frequency of digits, and to then identify digit frequencies that violate that normal behavior. With respect to invoices that result from an out of the ordinary volume of activities, a rapid invoice volume increase (e.g., from two invoices per month, to fifty invoices), may indicate fraudulent activity. With respect to invoices that include an above average invoice amount (e.g., an increase from an average invoice amount of $1000 to $20,000), such increases may indicate fraudulent activity.

FIGS. 8A-8D illustrate various user interface displays for the proactive duplicate identification system 100, according to an example of the present disclosure.

Referring to FIG. 8A, a user of the system 100 may create a customized data form (i.e., an indexing form) for validation (i.e., duplicate analysis) of the document 104. With respect to creation of the indexing form, the creation menu may include options such as edit (configure) or delete the indexing form, provided that the indexing form that will be selected has not already been used to process any data, in which case a new indexing form may be selected. For example, as disclosed herein, the document data extractor 108 may process the document 104 to dynamically configure a form related to the document 104 for upload of the data 102.

Referring to FIG. 8B, a user of the system 100 may configure the customized data form. Configuration of the customized data form may include options with respect to the name of the field, the type of the field (e.g., textbox, datepicker, numeric, dropdownlist, calculated field), the field code of the field (e.g., one of the key fields, or one of the reserved fields), and an option to remove a field. For example, as disclosed herein, with respect to dynamic configuration of the form related to the document 104, the document data extractor 108 may provide for the configuration (i.e., customization) of various fields of the form related to the document 104, the type of the data 102 of the document 104, and any validations related to the document 104.

Referring to FIG. 8C, the customized form of FIGS. 8A and 8B may include various fields including invoice number, invoice date, vendor name, invoice amount, etc. The indexing form illustrated in FIG. 8C may provide the interface for processing of the document 104 (e.g., an invoice). Proactive duplicate validation may be performed upon encoding of the data in the appropriate fields, and duplicates may be identified via the autocomplete feature. The interface for the indexing form may include a "save" option, which once clicked, the data that is encoded may be processed for validation. Once the data has been identified as being clean from any duplicates, the data may be saved. However, if the data is detected as being a probable duplicate, that data may be subject to further review. The interface for the indexing form may also include a "reject as double" option which may be used by the data indexer and analyzer 110 upon a determination that the data is a duplicate.

Referring to FIG. 8D, the duplicate analysis rules 112, that include, for example, core duplicate analysis rules, fuzzy matching rules, and other user-defined rules, may be configured by a user of the system 100. The duplicate analysis rules 112 may be applied on an indexing form, and serve as the basis for duplicate validation. The user interface display of FIG. 8D may provide a name of each of the duplicate analysis rules 112, the type of criteria that will be applied to the key fields (e.g., the vendor number, the invoice number, the invoice date, and the invoice amount), and the status if a duplicate analysis rule will be activated or deactivated. The user interface display of FIG. 8D may also provide for the configuration of the "similar" criterion for the fuzzy matching rules (e.g., as a percentage of matching such as 30%, 60%, and 90%).

The elements of the system 100 may be machine readable instructions stored on a non-transitory computer readable medium. In this regard, the system 100 may include or be a non-transitory computer readable medium. In addition, or alternatively, the elements of the system 100 may be hardware or a combination of machine readable instructions and hardware, where the machine readable instructions may be executed by a hardware processor and/or other hardware elements.

Figure 9:
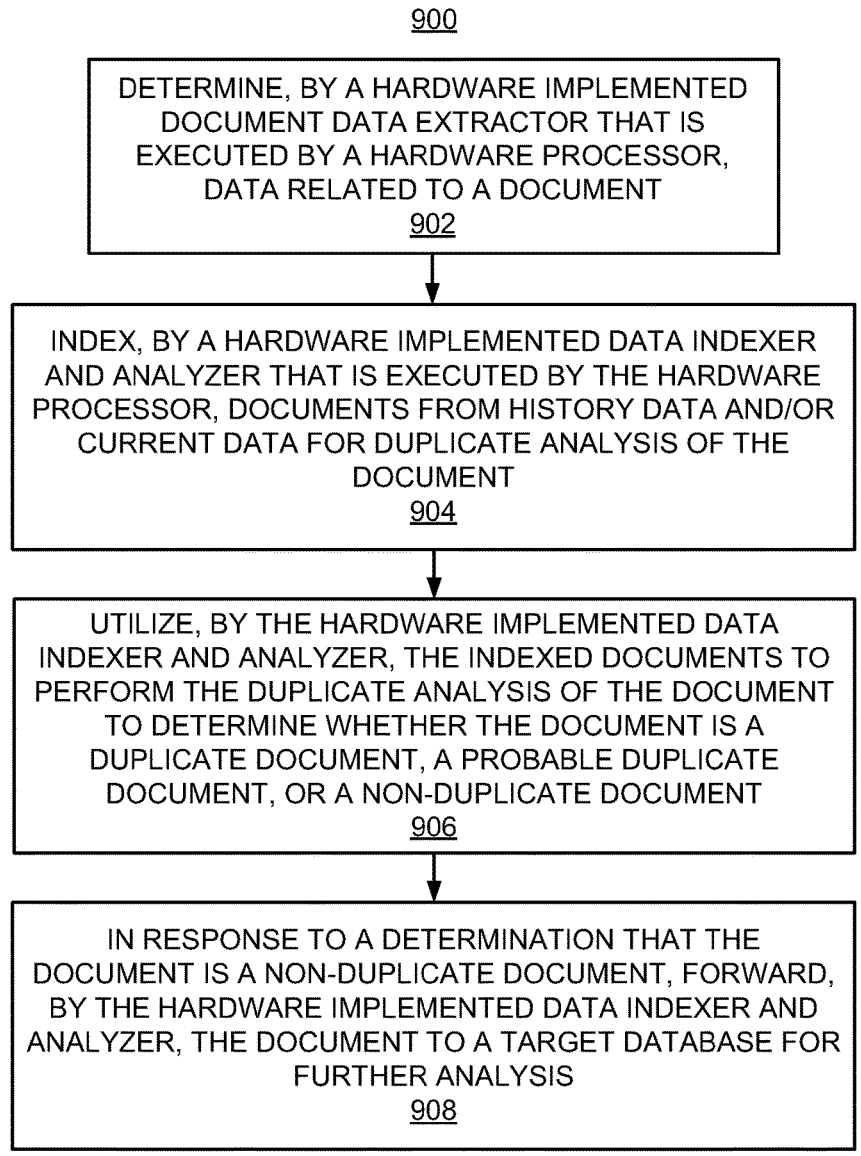
FIG. 9 illustrates a method for proactive duplicate identification, according to an example of the present disclosure.
Figure 10:
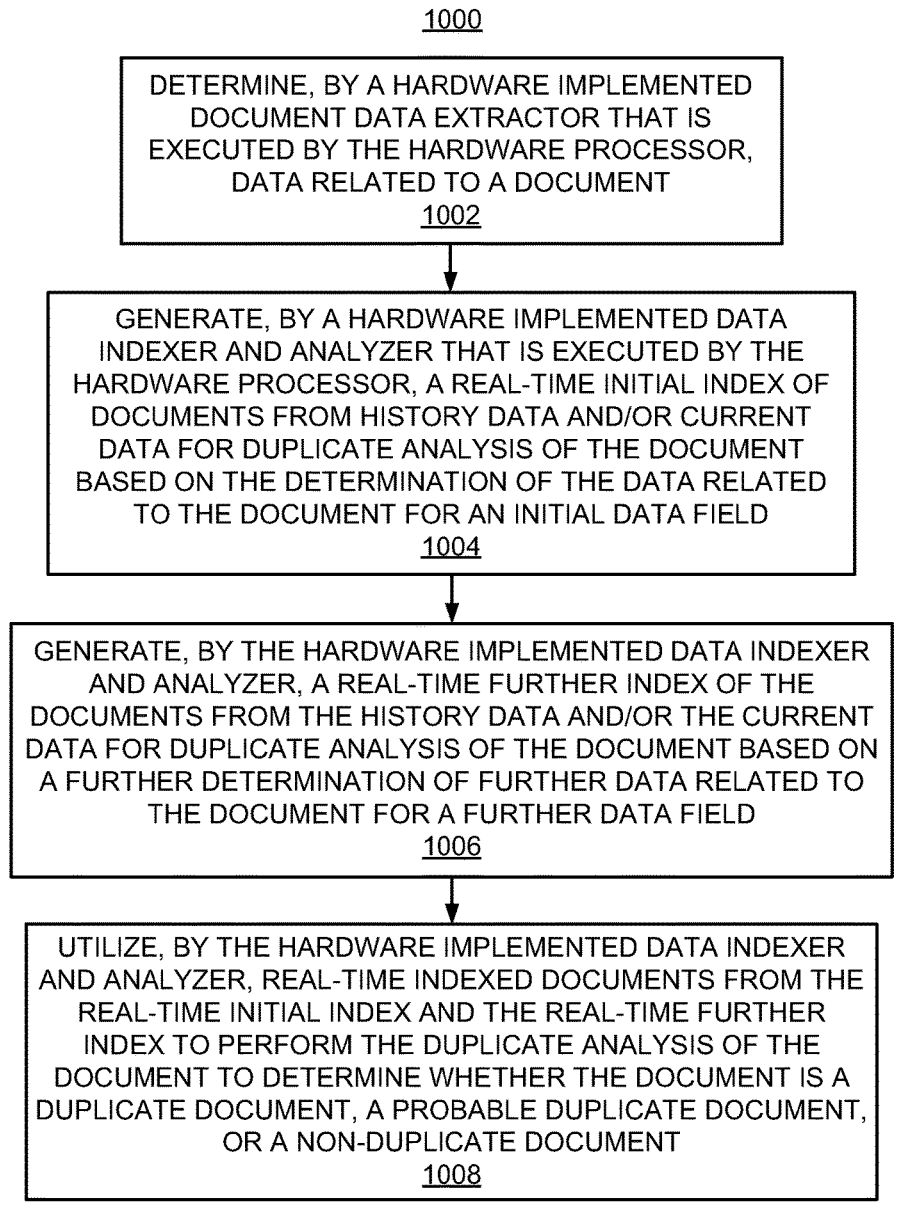
FIG. 10 illustrates further details of the method for proactive duplicate identification, according to an example of the present disclosure.

FIGS. 9 and 10 illustrate flowcharts of methods 900 and 1000 for proactive duplicate identification, according to examples. The methods 900 and 1000 may be implemented on the proactive duplicate identification system 100 described above with reference to FIGS. 1-8D by way of example and not limitation. The methods 900 and 1000 may be practiced in other systems.

Referring to FIGS. 1-9, at block 902, the method 900 may include determining, by the hardware implemented document data extractor 108 that is executed by the hardware processor, the data 102 related to the document 104.

At block 904, the method 900 may include indexing, by the hardware implemented data indexer and analyzer 110 that is executed by the hardware processor, documents from history data and/or current data for duplicate analysis of the document 104. A time-frame for the history data may be greater than a time-frame for the current data. The indexing of the documents may include an initial indexing based on the determination of the data 102 related to the document 104 for an initial data field, and a further indexing based on a further determination of further data 102 related to the document 104 for a further data field. The initial indexing based on the initial data field may narrow a scope of the documents that are used from the history data and/or the current data for the duplicate analysis of the document 104, and the further indexing based on the further data field may further narrow the scope of the documents that are used from the history data and/or the current data for the duplicate analysis of the document 104.

At block 906, the method 900 may include utilizing, by the hardware implemented data indexer and analyzer 110, the indexed documents to perform the duplicate analysis of the document 104 to determine whether the document 104 is a duplicate document, a probable duplicate document, or a non-duplicate document.

At block 908, in response to a determination that the document 104 is a non-duplicate document, the method 900 may include forwarding, by the hardware implemented data indexer and analyzer 110, the document 104 to a target database 106 for further analysis.

According to an example, for the method 900, the target database 106 may be an ERP system database.

According to an example, the method 900 may further include utilizing, by the hardware implemented fraud detector 128 that is executed by the hardware processor, a fraud detection rule to analyze the data 102 related to the document 104 to determine whether the document 104 includes fraudulent information. The document 104 may be an invoice, and the fraud detection rule may include a determination of whether a payment amount related to the invoice is approximately equal to a threshold amount for approval of the payment amount.

According to an example, for the method 900, indexing, by the hardware implemented data indexer and analyzer 110, the documents from the history data and/or the current data for the duplicate analysis of the document 104, may further include indexing in real-time, by the hardware implemented data indexer and analyzer 110, the documents from the history data and/or the current data for duplicate analysis of the document 104. The real-time indexing may be based on the data 102 related to the document 104 for the initial data field, and the data 102 related to the document 104 for the further data field.

According to an example, for the method 900, determining, by the hardware implemented document data extractor 108, the data 102 related to the document 104, may further include determining, by the hardware implemented document data extractor 108, the data 102 related to the document 104 based on a real-time configuration of a form related to the document 104. The form may include the initial data field, the further data field, and a user-definable data field.

According to an example, the method 900 may further include utilizing, by the hardware implemented duplicate validator 120 that is executed by the hardware processor, a duplicate validation rule to validate the probable duplicate document determination by the hardware implemented data indexer and analyzer 110.

According to an example, the method 900 may further include validating, by the hardware implemented duplicate validator 120 that is executed by the hardware processor, the probable duplicate document determination by the hardware implemented data indexer and analyzer 110 based on receipt of a response to a validity query.

According to an example, the method 900 may further include generating, by the hardware implemented duplicate report generator 124 that is executed by the hardware processor, the report 126 related to the duplicate analysis by the hardware implemented data indexer and analyzer 110. The report may be based on Pareto analysis related to an attribute of the document 104. The attribute may be related, for example, to analysis by vendor having duplicates, analysis by type of match (e.g., exact, similar, or no match), analysis on vendor name (e.g., in the case of invoices) on duplicate count and amount, and/or analysis by agent name on duplicates that are not identified during indexing by the data indexer and analyzer 110, but identified as duplicates by the duplicate validator 120.

According to an example, the method 900 may further include utilizing, by the hardware implemented fraud detector 128 that is executed by the hardware processor, a fraud detection rule to analyze the data 102 related to the document 104 to determine whether the document 104 includes fraudulent information. The fraud detection rule may include a determination of whether a digit frequency of the data 102 related to the document 104 violates expected behavior.

According to an example, the method 900 may further include indexing, by the hardware implemented data indexer and analyzer 110, in real-time, the documents from the history data and/or the current data for duplicate analysis of the document 104, and the real-time indexing may be based on the data 102 related to the document 104 for the initial data field, and the data 102 related to the document 104 for the further data field.

According to an example, the method 900 may further include determining, by the hardware implemented document data extractor 108, the data 102 related to the document 104 based on a real-time configuration of a form related to the document 104, and the form may include the initial data field, and the further data field.

According to an example, the method 900 may further include utilizing, by the hardware implemented data indexer and analyzer 110, a duplicate analysis rule to compare the data 102 related to the document 104 to data of the indexed documents for duplicate analysis of the document 104, and the duplicate analysis rule may include a core duplicate analysis rule to determine whether the data 102 related to the document 104 is an exact match, similar to, or different from the data of the indexed documents.

According to an example, the method 900 may further include utilizing, by the hardware implemented data indexer and analyzer 110, a duplicate analysis rule to compare the data 102 related to the document 104 to data of the indexed documents for duplicate analysis of the document 104, and the duplicate analysis rule may include a fuzzy matching rule to determine whether the data 102 related to the document 104 is within a predetermined percentage range of the data of the indexed documents, includes a predetermined digit pattern compared to the data of the indexed documents, or is similar to the data of the indexed documents based on omission of leading or trailing digits of the data of the indexed documents.

According to an example, the method 900 may further include utilizing, by the hardware implemented data indexer and analyzer 110, a duplicate analysis rule to compare the data 102 related to the document 104 to data of the indexed documents for duplicate analysis of the document 104, and the duplicate analysis rule may include a fuzzy matching rule to determine whether the data 102 related to the document 104 that includes a date related to the document 104 is within a predetermined day range of the data of the indexed documents.

Referring to FIGS. 1-8D and 10, at block 1002, the method 1000 may include determining, by the hardware implemented document data extractor 108 that is executed by the hardware processor, the data 102 related to the document 104.

At block 1004, the method 1000 may include generating, by the hardware implemented data indexer and analyzer 110 that is executed by the hardware processor, a real-time initial index of documents from history data and/or current data for duplicate analysis of the document 104 based on the determination of the data 102 related to the document 104 for an initial data field. According to an example, a time-frame for the history data may be greater than a time-frame for the current data.

At block 1006, the method 1000 may include generating, by the hardware implemented data indexer and analyzer 110, a real-time further index of the documents from the history data and/or the current data for duplicate analysis of the document 104 based on a further determination of further data 102 related to the document 104 for a further data field. The real-time initial index may narrow a scope of the documents that are used for the duplicate analysis of the document 104, and the real-time further index may further narrow the scope of the documents that are used for the duplicate analysis of the document 104.

At block 1008, the method 1000 may include utilizing, by the hardware implemented data indexer and analyzer 110, real-time indexed documents from the real-time initial index and the real-time further index to perform the duplicate analysis of the document 104 to determine whether the document 104 is a duplicate document, a probable duplicate document, or a non-duplicate document.

According to an example, the method 1000 may further include utilizing, by the hardware implemented fraud detector 128 that is executed by the hardware processor, a fraud detection rule to analyze the data 102 related to the document 104 to determine whether the document 104 includes fraudulent information. The document 104 may be an invoice, and the fraud detection rule may include a determination of whether a payment amount related to the invoice is above an average payment amount for a predetermined time period for a vendor related to the invoice.

According to an example, the method 1000 may further include utilizing, by the hardware implemented data indexer and analyzer 110, a duplicate analysis rule to compare the data 102 related to the document 104 to data of the indexed documents for duplicate analysis of the document 104. The duplicate analysis rule may include a core duplicate analysis rule to determine whether the data 102 related to the document 104 is an exact match, similar to, or different from the data of the indexed documents. In response to a determination that the data 102 related to the document 104 is the exact match to the data of the indexed documents, the document 104 may be identified as the duplicate document. In response to a determination that the data 102 related to the document 104 is similar to the data of the indexed documents, the document 104 may be identified as the probable duplicate document. In response to a determination that the data 102 related to the document 104 is different from the data of the indexed documents, the document 104 may be identified as the non-duplicate document.

According to an example, the method 1000 may further include performing, by the hardware implemented data indexer and analyzer 110, the duplicate analysis of the document 104 prior to forwarding of the document 104 to an ERP system.

According to an example, the method 1000 may further include validating, by the hardware implemented duplicate validator 120 that is executed by the hardware processor, the probable duplicate document determination by the hardware implemented data indexer and analyzer 110 based on receipt of a response to a validity query, and generating, by the hardware implemented duplicate report generator 124 that is executed by the hardware processor, the report 126 related to the duplicate analysis by the hardware implemented data indexer and analyzer 110. The report may be based on a determination of documents that are identified as being the probable duplicate document by the hardware implemented data indexer and analyzer 110 and as being the duplicate document or the non-duplicate document by the hardware implemented duplicate validator 120.

Figure 11:
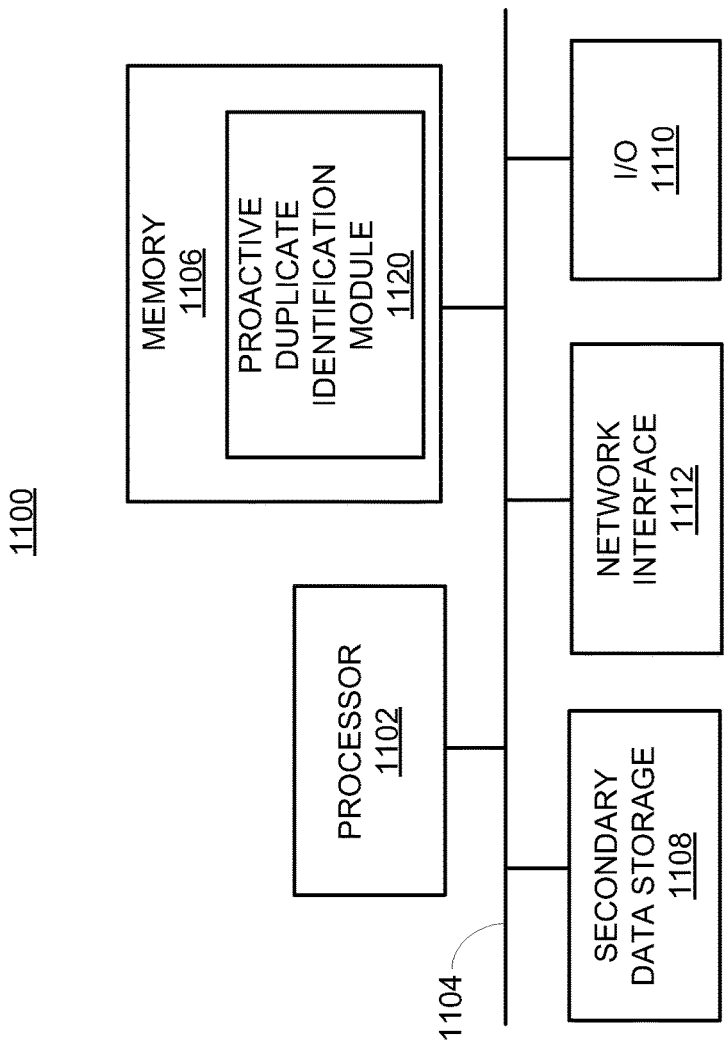
FIG. 11 illustrates a computer system, according to an example of the present disclosure.

FIG. 11 shows a computer system 1100 that may be used with the examples described herein. The computer system may represent a generic platform that includes components that may be in a server or another computer system. The computer system 1100 may be used as a platform for the system 100. The computer system 1100 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1100 may include a processor 1102 that may implement or execute machine readable instructions performing some or all of the methods, functions and other processes described herein. Commands and data from the processor 1102 may be communicated over a communication bus 1104. The computer system may also include a main memory 1106, such as a random access memory (RAM), where the machine readable instructions and data for the processor 1102 may reside during runtime, and a secondary data storage 1108, which may be non-volatile and stores machine readable instructions and data. The memory and data storage are examples of computer readable mediums. The memory 1106 may include a proactive duplicate identification module 1120 including machine readable instructions residing in the memory 1106 during runtime and executed by the processor 1102. The proactive duplicate identification module 1120 may include the elements of the system 100 shown in FIG. 1.

The computer system 1100 may include an I/O device 1110, such as a keyboard, a mouse, a display, etc. The computer system may include a network interface 1112 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A proactive duplicate identification system comprising:
   at least one hardware processor;
   a document data extractor, executed by the at least one hardware processor, to receive a document, and determine data related to the document, wherein the received document is designated an input document; and
   a data indexer and analyzer, executed by the at least one hardware processor, to
      reduce at least one of a processing time or central processing unit (CPU) cycles associated with duplicate analysis of documents from at least one of a database including history data or a database including current data by indexing, based on the determined data related to the input document, the documents from the at least one of the history data or the current data for duplicate analysis of the input document relative to the documents from the at least one of the history data or the current data, wherein
         a time-frame for the history data is greater than a time-frame for the current data,
         the indexing of the documents includes an initial indexing based on the determination of the data related to the document for an initial data field, and a further indexing based on a further determination of further data related to the document for a further data field, and
         the initial indexing based on the initial data field based on the determination of the data related to the document reduces a number of the documents that are used from the at least one of the history data or the current data for the duplicate analysis of the document, and the further indexing based on the further data field based on the further determination of the further data related to the document further reduces the number of the documents that are used from the at least one of the history data or the current data for the duplicate analysis of the document, and
      use the reduced number of documents from the initial indexing and the further indexing to perform the duplicate analysis of the document to determine whether the document is a duplicate document, a probable duplicate document, or a non-duplicate document.

2. The proactive duplicate identification system according to claim 1, further comprising:
   a duplicate validator, executed by the at least one hardware processor, to validate the probable duplicate document determination by the data indexer and analyzer based on receipt of a response to a validity query.

3. The proactive duplicate identification system according to claim 1, further comprising:
   a duplicate report generator, executed by the at least one hardware processor, to generate a report related to the duplicate analysis by the data indexer and analyzer, wherein the report is based on Pareto analysis related to an attribute of the document.

4. The proactive duplicate identification system according to claim 1, further comprising:
   a fraud detector, executed by the at least one hardware processor, to utilize at least one fraud detection rule to analyze the data related to the document to determine whether the document includes fraudulent information, wherein the at least one fraud detection rule includes a determination of whether a digit frequency of the data related to the document violates expected behavior.

5. The proactive duplicate identification system according to claim 1, wherein
   the data indexer and analyzer is to index, in real-time, the documents from the at least one of the history data or the current data for the duplicate analysis of the document, and
   the real-time indexing is based on the data related to the document for the initial data field, and the data related to the document for the further data field.

6. The proactive duplicate identification system according to claim 1, wherein the document data extractor is to determine the data related to the document based on a real-time configuration of a form related to the document, and
the form includes the initial data field, and the further data field.

7. The proactive duplicate identification system according to claim 1, wherein
the data indexer and analyzer is to utilize at least one duplicate analysis rule to compare the data related to the document to data of the indexed documents for duplicate analysis of the document, and
the at least one duplicate analysis rule includes at least one core duplicate analysis rule to determine whether the data related to the document is an exact match, similar to, or different from the data of the indexed documents.

8. The proactive duplicate identification system according to claim 1, wherein
the data indexer and analyzer is to utilize at least one duplicate analysis rule to compare the data related to the document to data of the indexed documents for duplicate analysis of the document, and
the at least one duplicate analysis rule includes at least one fuzzy matching rule to determine whether the data related to the document is at least one of
within a predetermined percentage range of the data of the indexed documents,
includes a predetermined digit pattern compared to the data of the indexed documents, or
is similar to the data of the indexed documents based on omission of leading or trailing digits of the data of the indexed documents.

9. The proactive duplicate identification system according to claim 1, wherein
the data indexer and analyzer is to utilize at least one duplicate analysis rule to compare the data related to the document to data of the indexed documents for duplicate analysis of the document, and
the at least one duplicate analysis rule includes at least one fuzzy matching rule to determine whether the data related to the document that includes a date related to the document is within a predetermined day range of the data of the indexed documents.

10. The proactive duplicate identification system according to claim 1, further comprising:
a duplicate validator, executed by the at least one hardware processor, to utilize at least one duplicate validation rule to validate the probable duplicate document determination by the data indexer and analyzer.

11. A method for proactive duplicate identification, the method comprising:
determining, by a document data extractor that is executed by at least one hardware processor, data related to an input document;
reducing at least one of a processing time or central processing unit (CPU) cycles associated with duplicate analysis of documents from at least one of a database including history data or a database including current data by indexing, by a data indexer and analyzer that is executed by the at least one hardware processor and based on the determined data related to the input document, the documents from the at least one of the history data or the current data for duplicate analysis of the input document relative to the documents from the at least one of the history data or the current data, wherein
a time-frame for the history data is greater than a time-frame for the current data,
the indexing of the documents includes an initial indexing based on the determination of the data related to the document for an initial data field, and a further indexing based on a further determination of further data related to the document for a further data field, and
the initial indexing based on the initial data field based on the determination of the data related to the document reduces a number of the documents that are used from the at least one of the history data or the current data for the duplicate analysis of the document, and the further indexing based on the further data field based on the further determination of the further data related to the document further reduces the number of the documents that are used from the at least one of the history data or the current data for the duplicate analysis of the document;
utilizing, by the data indexer and analyzer, the reduced number of documents from the initial indexing and the further indexing to perform the duplicate analysis of the document to determine whether the document is a duplicate document, a probable duplicate document, or a non-duplicate document; and
in response to a determination that the document is a non-duplicate document, forwarding, by the data indexer and analyzer, the document to a target database for further analysis.

12. The method for proactive duplicate identification according to claim 11, wherein the target database is an enterprise resource planning (ERP) system database.

13. The method for proactive duplicate identification according to claim 11, further comprising:
utilizing, by a fraud detector that is executed by the at least one hardware processor, at least one fraud detection rule to analyze the data related to the document to determine whether the document includes fraudulent information, wherein
the document is an invoice, and
the at least one fraud detection rule includes a determination of whether a payment amount related to the invoice is approximately equal to a threshold amount for approval of the payment amount.

14. The method for proactive duplicate identification according to claim 11, wherein indexing, by the data indexer and analyzer, the documents from at least one of the history data or the current data for the duplicate analysis of the document, further comprises:
indexing in real-time, by the data indexer and analyzer, the documents from the at least one of the history data or the current data for duplicate analysis of the document, wherein the real-time indexing is based on the data related to the document for the initial data field, and the data related to the document for the further data field.

15. The method for proactive duplicate identification according to claim 11, wherein determining, by the document data extractor, the data related to the document, further comprises:
determining, by the document data extractor, the data related to the document based on a real-time configuration of a form related to the document, wherein the form includes the initial data field, the further data field, and a user-definable data field.

16. A non-transitory computer readable medium having stored thereon machine readable instructions for proactive duplicate identification, the machine readable instructions when executed cause at least one hardware processor to:

determine, by a document data extractor that is executed by the at least one hardware processor, data related to an input document;

reduce at least one of a processing time or central processing unit (CPU) cycles associated with duplicate analysis of documents from at least one of a database including history data or a database including current data by generating, by a data indexer and analyzer that is executed by the at least one hardware processor and based on the determined data related to the input document, a real-time initial index of the documents from the at least one of the history data or the current data for duplicate analysis of the input document based on the determination of the data related to the document for an initial data field, wherein a time-frame for the history data is greater than a time-frame for the current data;

generate, by the data indexer and analyzer, a real-time further index of the documents from the at least one of the history data or the current data for duplicate analysis of the document based on a further determination of further data related to the document for a further data field, wherein the real-time initial index reduces a number of the documents that are used for the duplicate analysis of the document, and the real-time further index further reduces the number of the documents that are used for the duplicate analysis of the document; and utilize, by the data indexer and analyzer, real-time reduced number of indexed documents from the real-time initial index and the real-time further index to perform the duplicate analysis of the document to determine whether the document is a duplicate document, a probable duplicate document, or a non-duplicate document.

17. The non-transitory computer readable medium according to claim 16, further comprising machine readable instructions to:

utilize, by a fraud detector that is executed by the at least one hardware processor, at least one fraud detection rule to analyze the data related to the document to determine whether the document includes fraudulent information, wherein the document is an invoice, and the at least one fraud detection rule includes a determination of whether a payment amount related to the invoice is above an average payment amount for a predetermined time period for a vendor related to the invoice.

18. The non-transitory computer readable medium according to claim 16, further comprising machine readable instructions to:

utilize, by the data indexer and analyzer, at least one duplicate analysis rule to compare the data related to the document to data of the indexed documents for duplicate analysis of the document, wherein the at least one duplicate analysis rule includes at least one core duplicate analysis rule to determine whether the data related to the document is an exact match, similar to, or different from the data of the indexed documents;

in response to a determination that the data related to the document is the exact match to the data of the indexed documents, identify the document as the duplicate document;

in response to a determination that the data related to the document is similar to the data of the indexed documents, identify the document as the probable duplicate document; and in response to a determination that the data related to the document is different from the data of the indexed documents, identify the document as the non-duplicate document.

19. The non-transitory computer readable medium according to claim 16, further comprising machine readable instructions to:

perform, by the data indexer and analyzer, the duplicate analysis of the document prior to forwarding of the document to an enterprise resource planning (ERP) system.

20. The non-transitory computer readable medium according to claim 16, further comprising machine readable instructions to:

validate, by a duplicate validator that is executed by the at least one hardware processor, the probable duplicate document determination by the data indexer and analyzer based on receipt of a response to a validity query; and generate, by a duplicate report generator that is executed by the at least one hardware processor, a report related to the duplicate analysis by the data indexer and analyzer, wherein the report is based on a determination of documents that are identified as being the probable duplicate document by the data indexer and analyzer and as being the duplicate document or the non-duplicate document by the duplicate validator.

* * * * *